United States Patent [19]

Nishino

[11] 3,751,133
[45] Aug. 7, 1973

[54] COLOR SEPARATION OPTICAL SYSTEM

[75] Inventor: Hisashi Nishino, Sakai, Japan

[73] Assignee: Minolta Camera Kabushiki Kaisha, Osaka, Japan

[22] Filed: May 11, 1971

[21] Appl. No.: 142,321

[30] Foreign Application Priority Data
May 13, 1970 Japan.............................. 45/40672

[52] U.S. Cl.............. 350/54, 350/166, 350/196, 178/5.4 ST
[51] Int. Cl. ............................................ G02b 5/28
[58] Field of Search ............... 350/8, 45, 54, 317, 350/163–166, 196; 178/5.4 ST

[56] References Cited
UNITED STATES PATENTS

| | | | |
|---|---|---|---|
| 2,630,485 | 3/1953 | Heikes et al. | 178/5.4 ST |
| 2,696,520 | 12/1954 | Bradley | 178/5.4 ST |
| 3,410,626 | 11/1968 | Magrath | 350/166 |

FOREIGN PATENTS OR APPLICATIONS

| | | | |
|---|---|---|---|
| 634,776 | 3/1950 | Great Britain | 350/164 |

OTHER PUBLICATIONS

Debrowolski, J. A., "Optical Interference Filters for the Adjustment of Spectral Response & Spectral Power Distribution", applied Optics, Vol. 9, No. 6 June 1970, pps. 1396–1402.

*Primary Examiner*—David H. Rubin
*Attorney*—Stanley Wolder

[57] ABSTRACT

A color separation optical system having a mosaic shaped color filter provided with a transparent base body and having a dichroic filter provided on one of its sides so as to improve its permeability and the spectral permeable characteristics and the other surface of the transparent base body is neither parallel nor concentric to the filter side. The light ray of the reflected light ray in said dichroic filter, which is reflected again by the back side of said transparent base body is stopped from entering the incident picture angle of the relay lens in the color separation optical system, preventing ghosts.

13 Claims, 22 Drawing Figures

FIG. 5(a)  FIG. 5(b)  FIG. 5(c)
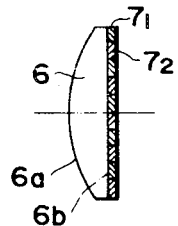 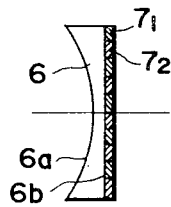 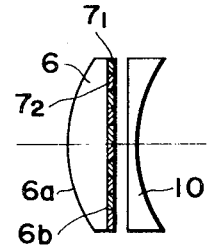
FIG. 5(d)  FIG. 5(e)  FIG. 5(f)
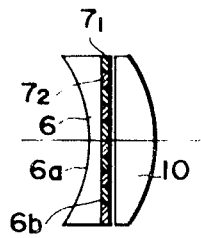 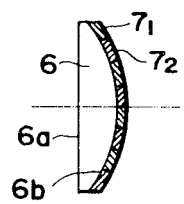 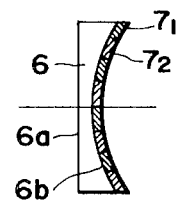
FIG. 5(g)  FIG. 5(h)
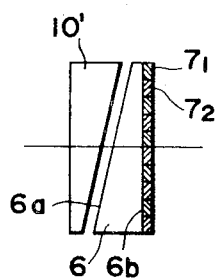 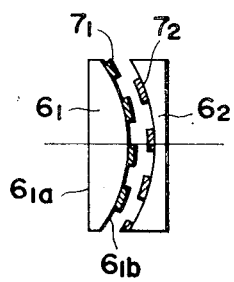
FIG. 5(i)  FIG. 5(j)
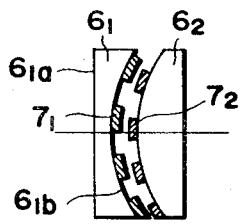 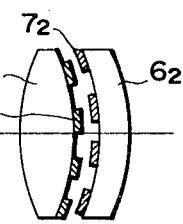
INVENTOR.
HISASHI NISHINO
BY

INVENTOR.
HISASHI NISHINO

COLOR SEPARATION OPTICAL SYSTEM

BACKGROUND OF THE INVENTION

The present invention relates to a color separation optical system and more particularly to a mosaic shaped color filter in a color separation optical system, which is composed of a transparent base body with a dichroic filter provided on one side thereof so as to prevent ghosts from being generated by reflected rays in said dichroic filter.

The color separation optical system used in the single image tube type color television camera forms an object image on the image forming surface of a mosaic shaped color filter by means of the objective lens and directs the image forming light rays into the incident picture angle of the relay lens by means of the field lens thus obtaining an image of the color picture element corresponding to the mosaic shaped filter by means of said relay lens. That is, in a single image tube type color television said image of the color picture element is formed in the image tube.

Said mosaic shaped filter in the color separation optical system is in general composed of a transparent base body and absorption filter disposed in the mosaic shape on said transparent base body, and said absorption filter is used in combination with two of the following three kinds of filters in order to get picture elements of three primary colors of red, green, and blue: a magenta color filter which permeates the light in the wave length range of red and blue and absorbs the light in the green wave length range, a cyanine color filter which permeates the light in the wave length range of blue and green and absorbs the color in the wave length range of red, and a yellow color filter which permeates the light in the wave length range of green and red and absorbs the light in the wave length range of blue. For example, in the case of the former two filters used, said both filters can be adhered respectively onto transparent base bodies to face to each other, or both filters can be adhered in the mosaic shape onto one transparent base body. However, in any case, the respective filters should be in parallel with each other and both filters should be disposed so as to overlap in discrepancy from each other. And thus, a portion passed through said both filters passes through only the wave length range of blue and a portion passed through one of said both filters is the magenta color light or the cyanine color light, and a portion not passed through said both filters becomes white. Accordingly, a mosaic shaped color film can be obtained.

In the case of the absorption filter used, however, the absorption of the light in the wave length range passing through is significant and it is hard to produce a large quantity of filters having a uniform spectral permeable characteristic.

The dichroic filter making use of the interference of light has a permeability of about 100 percent in the permeable wave length range and in addition it is possible to obtain easily a large quantity of filters in the spectral permeable characteristic desired. Therefore, it is easily devised that said filter be made a dichroic filter.

The dichroic filter, however, has a large permeability in the permeable wave length range, while it has the very high reflection factor in the reflection wave length range.

As the result, the reflected light ray in the case of the absorption filter used is negligible, while in the case of the dichroic filter the light ray in the nonpermeable range is reflected about 100 percent and this is again reflected by the back side of the transparent base body to pass through other mosaic portions of the mosaic shaped color filter, for example, the white portion, and form a ghost. This results in deterioration of the contrast of picture image and brings about a phenomenon of color spread in the case of, for example, a single image tube type color television.

Besides, there are the image forming rays coming perpendicularly into the mosaic shaped color filter through the objective lens, and the image forming rays coming diagonally thereinto. However, in the case of the absorption filter when the light path passing through the filter comes diagonally thereinto, the light path is only a little longer as compared with the case of coming perpendicularly thereinto, so that the lightness of the light ray passed through is little changed and the spectral permeable characteristic is not changed at all.

Whereas, in the dichroic filter said light path difference comes into question in the order of the wave lengths, therefore, in the cases of coming diagonally thereinto and of coming perpendicularly thereinto, the spectral characteristic of the light rays passed through are remarkably different from each other. This fact means that on the central portion and on the perimeter portion of the picture image the color tone is changed resulting in a drawback in the mosaic shaped color filter.

OBJECTS OF THE INVENTION

A principal object of the present invention is to remove said first drawback and to provide a color separation optical system containing a mosaic shaped color filter composed of a dichroic filter and a transparent base body thereof, in which the reflected light ray by said dichroic filter is reflected again on the back side of said transparent base body and the image formed by a relay lens is protected against deterioration of the contrast effected by a ghost and spread of the color.

Another object of the present invention is to provide a color separation optical system with said mosaic shaped filter, in which the image forming light ray emitted from the objective lens comes into a dichroic filter piece of the mosaic shaped filter, keeping the incident angle almost constant.

Other objects of the present invention will become apparent upon reading the description of the embodiment in accordance with the present invention stated hereinafter.

SUMMARY OF THE INVENTION

In order to attain the above-mentioned objects, the present invention relates to a color separation optical system so constructed that one side of a transparent base body is provided with a dichroic filter of a mosaic shaped color filter. The other side thereof is oblique, that is it is formed into a surface not in parallel nor in concentricity, and the light ray of the reflected rays on the dichroic filter, which is reflected again on the back side of said transparent base body is reflected outside the incident picture angle of the relay lens in said color separation optical system.

Particularly, the back side of said transparent base body is oblique to the surface provided with said dichroic filter, that is, as the term oblique is used in this connection herein and in the claims, it is not a parallel surface nor a concentric surface relative to the surface provided with said dichroic filter, so that the reflected light ray in the high reflection factor of a specific wave length effected by said dichroic filter is changed in the direction directed thereof in reflecting on the back side of said transparent base body as compared with the light ray passing through said mosaic shaped color film directly from the objective lens, and even though this is refracted by the field lens the refracted light ray is outside the incident picture angle of the relay lens. Thus, therefore, said relay lens does not allow such a light ray to form an image on its image forming plane.

BRIEF DESCRIPTION OF THE DRAWINGS

FIGS. 5(a)(b)(c)(d)(e)(f)(g)(h)(i)(j) are respectively a side view in longitudinal section showing another example of every kind of mosaic shaped color filter in accordance with the present invention.

DESCRIPTION OF THE PREFERRED EMBODIMENT

Figure 9A:
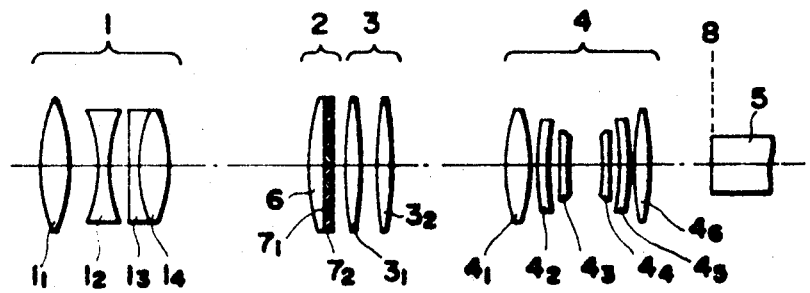
FIGS. 9(a)(b)(c) are respectively a side view of respective embodiment in which the color separation optical system in accordance with the present invention is carried out in a single image tube type color television camera.

FIGS. 9(a)(b)(c) show respectively an embodiment in accordance with the present invention, wherein in FIG. 9(a) lens component 1 composed of lenses $1_1$, $1_2$, $1_3$, $1_4$, constitutes an objective lens, reference numeral 2 denotes a mosaic shaped color filter, lens component 3 composed of lenses $3_1$, $3_2$ shows a field lens, and lens component 4 composed of lenses $4_1$, $4_2$, $4_3$, $4_4$, $4_5$, $4_6$, constitutes a relay lens. All said lenses form the color separation optical system in accordance with the present invention.

The mosaic shaped color filter 2 is composed of mosaic shaped filter piece 7 disposed on transparent glass base body 6.

In said formation, the image of an object formed by objective lens 1 is formed on filter piece 7 of mosaic shaped filter 2, and said image forming light ray is selectively colored by said filter piece 7 and directed to relay lens component 4 by field lens component 3, and in said relay lens component 4 the color picture element colored in accordance with respective filter is formed into an image on a desired image forming plane 8. In this respect the same action occurs as in prior art color separation optical system.

FIG. 9 shows an embodiment used in a single image tube type color television camera, wherein reference numeral 5 denotes an image tube and accordingly 8 denotes the image forming plane of said image tube 5. And, in general mosaic shaped color filter 2, field lens component 3, and relay lens component 4 are fixedly positioned in the color television camera and objective lens component 1 is detachably secured to the front of color television camera.

Figure 1:
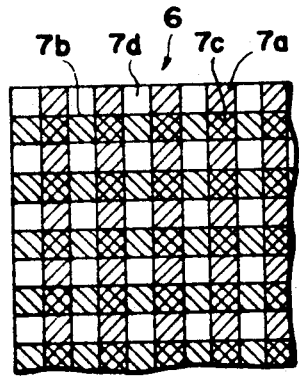
FIG. 1 is a front view showing an example of the mosaic shaped color filter of an embodiment in accordance with the present invention.
Figure 2:
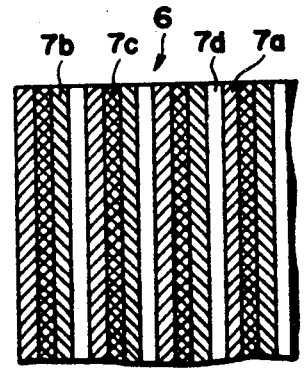
FIG. 2 is a front view showing another example of said mosaic shaped color filter.

In the present invention, filter piece 7 of said mosaic shaped color filter 2 is composed of a dichroic filter disposed on one side of transparent base body 6 and, as shown in FIG. 1 (more particularly in FIG. 4), it is so formed that two kinds of filters having spectral permeability different from each other. For example, filter piece 7a of magenta color and filter piece 7b of cyanine color are arranged to form portion 7c where both are crossed meeting at right angles with each other in the striped pattern shape and portion 7d where both are not in existence. Or as shown in FIG. 2 it can be so formed that two kinds of filters 7a, 7b are respectively provided with a space and disposed in parallel with each other so as to partially overlap to form striped pattern 7c where both filter pieces 7a, 7b are overlapped and striped pattern 7d where both filter pieces 7a, 7b are not located.

Figure 3:
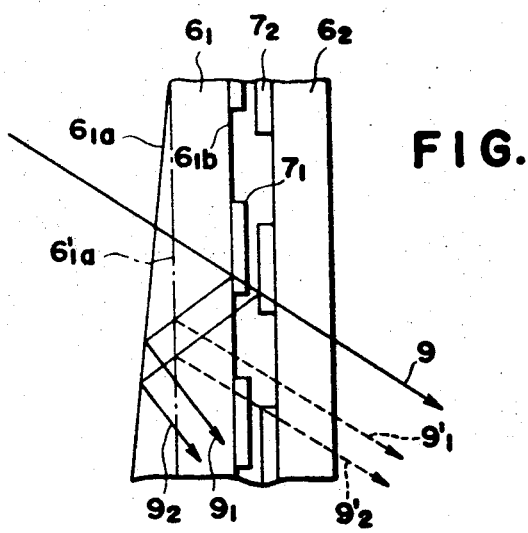
FIG. 3 is a side view in section showing further another example of said mosaic shaped color filter, showing the light ray incident to said filter and the light ray coming out therefrom.

Further, as shown in FIG. 3 it can be formed by forming filter pieces $7_1$ in the same color, which are disposed on one side of one transparent base body $6_1$, for example, into filter pieces 7a of magenta color; and forming filter pieces $7_2$ in the same color, which are disposed on the other transparent base body $6_2$, for example, into filter pieces 7b of cyanine color, and then facing both filter pieces $7_1$, $7_2$ in closing near to each other.

As also seen in FIG. 3, it is one characteristic of the present invention that at least incident side transparent base body $6_1$ has plane $6_{1b}$ provided with filter piece $7_1$ thereof and back side $6_{1a}$ thereof disposed not in parallel with each other.

Figure 4A:
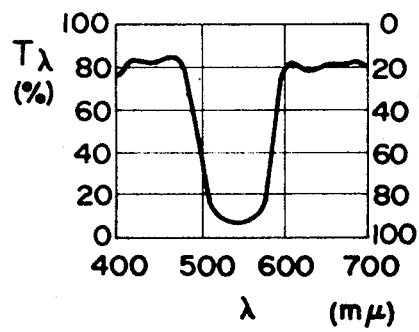
FIGS. 4(a)(b)(c) are respectively a curve diagram showing the spectral permeability and the spectral reflection factor of respective color filter in said embodiment.
Figure 4B:
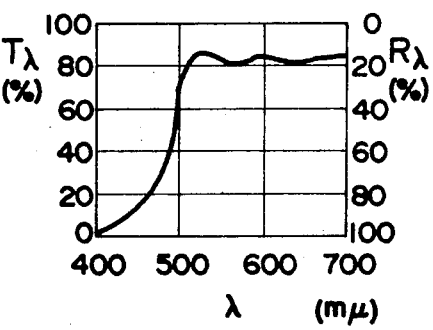
Figure 4C:
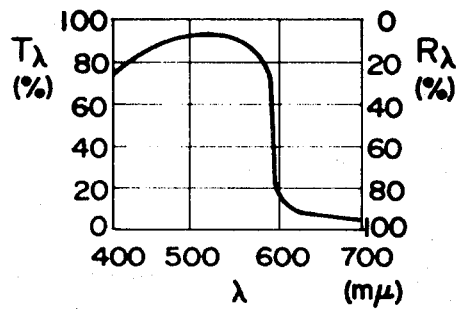

FIG. 4(a)(b)(c) show respectively the spectral permeability of the filter in one of three colors, wherein FIG. 4(a) shows a magenta color filter, FIG. 4(b) a yellow, and FIG. 4(c) a cyanine color filter. Since these are dichroic filters, provided respective spectral permeability is $t$, reflecting power $R\lambda$ reflects the light ray of $R\lambda = 1 - t\lambda$, and the reflecting power of the non-permeable wave length becomes about 100 percent.

Therefore, transparent base body $6_1$ on the incident side is composed of planes $6'_{1a}$ and $6_{1b}$ in parallel with each other as shown by the chain line, incident light ray 9 passes first through filter piece $7_1$. Now, provided said filter piece $7_1$ is magenta color, the wave length ranges of red and blue pass therethrough and the green light ray is reflected on said filter piece $7_1$. Further, when the permeable light rays pass through the cyanine color filter piece $7_2$ only the blue light ray permeates and the red light ray is reflected.

Figure 6:
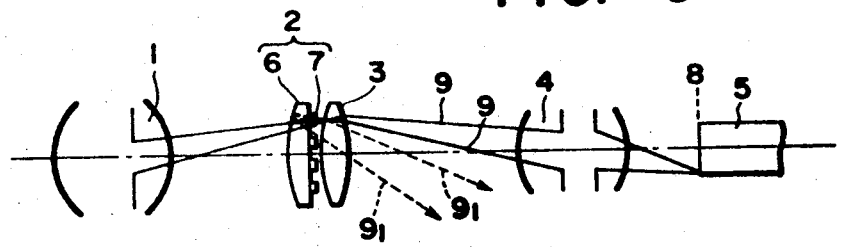
FIG. 6 shows the light path of the color separation optical system in accordance with the present invention.

A portion of the green light ray reflected by said magenta filter piece $7_1$ is reflected on plane $6'_{1a}$ of transparent base body $6_1$ and the reflected light ray $9'_1$ advances in parallel with permeable light ray (incident light ray) 9 to pass through filter piece $7_2$ or pass through the space between striped patterns of filter piece $7_2$ to advancing to field lens 3 not shown in the drawing and, the red light ray reflected on filter piece $7_2$ also passes through the space between striped patterns of filter piece $7_1$ and is reflected on plane $6'_{1a}$ of transparent base body $6_1$, and said reflected light ray $9'_2$ passes through the space between striped patterns of both filters pieces $7_1$, $7_2$ to advance in parallel with permeable light ray 9 to field lens component 3, and these reflected light rays form a ghost on the image forming plane through relay lens component 4. However, in the present invention, incident side $6_{1a}$ of transparent base body $6_1$ is not in parallel with plane $6_{1b}$ provided with the filter piece, so that these reflected light rays $9_1$, $9_2$ are reflected as shown by full lines, and in FIG. 6 as shown by broken lines they do not come under any circumstances into the incident picture angle of relay lens component 4, and also do not form ghost images under any circumstances.

In the case of that side $6_{1b}$ provided with the filter of transparent base body $6_1$ is a spherical surface, even though the incident side plane of the back side thereof is not a concentric spherical surface the facts described hereinbefore can be applied as well.

Various kinds of mosaic shaped color films for satisfying the conditions described hereinbefore are shown in FIGS. 5(a)(b)(c)(d)(e)(f)(g)(h)(i)(j). FIGS. 5(a)(b)(c)(d)(e)(f)(g) show those provided with two kinds of filter pieces on one transparent base body 6 as shown in FIG. 1, wherein FIG. 5(a) shows one provided with filter pieces $7_1$, $7_2$ on the plane of plano-convex lens shaped transparent base body 6 and FIG. 5(b) shows one provided with filter pieces $7_1$, $7_2$ on the plane of plano-concave lens shaped transparent base body 6. FIGS. 5 (c)(d) show respectively one in which lens action of transparent base body 6 is compensated by lens 10 in said FIGS. 5(a)(b), and FIGS. 5(e)(f) show respectively one in which the filter piece is located on the curved surface side in FIGS. 5(a)(b). FIG. 5(g) shows one provided with the filter piece on one side of prism shaped transparent base body 6 shown in FIG. 3, wherein prism 10' is for cancelling the prism action of transparent base body 6. FIG. 5(h) and FIG. 5(i) show respectively an embodiment provided with filter pieces $7_1$ and $7_2$ taking charge of a portion on transparent base body $6_1$ of the plano-convex lens and transparent base body $6_2$ of the plano-concave lens, and FIG. 5(j) shows an embodiment provided with one filter piece 7 on transparent base body $6_1$ of the biconvex lens, and the other filter piece $7_2$ on transparent base body $6_2$ of the concave-convex lens, so as to give the convergent lens action by means of both transparent base bodies $6_1$, $6_2$ and also effect the action of field lens component 3.

Figure 7:
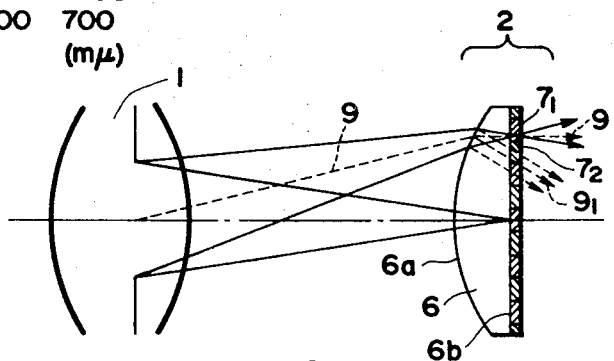
FIG. 7 shows the light path of the embodiment in which the image forming light ray from the objective lens comes perpendicularly into the filter making use of the mosaic shaped color filter shown in FIG. 5(a).

In the mosaic shaped color filter shown in FIG. 5(a), the action for converging the image forming light ray incident by the curved surface of plane 6a is brought about, so that the incident light ray can come into filter pieces $7_1$, $7_2$ nearly in the parallel state as shown in FIG. 7.

In general, for the dichroic filter the permeable wave length is decided by the interference of light, therefore, the light ray coming perpendicularly into said dichroic filter and the light ray coming diagonally into said dichroic filter are different from each other in the wave length range through which they pass. However, by arranging as described hereinbefore, the problem said fact can be eliminated.

Figure 8:
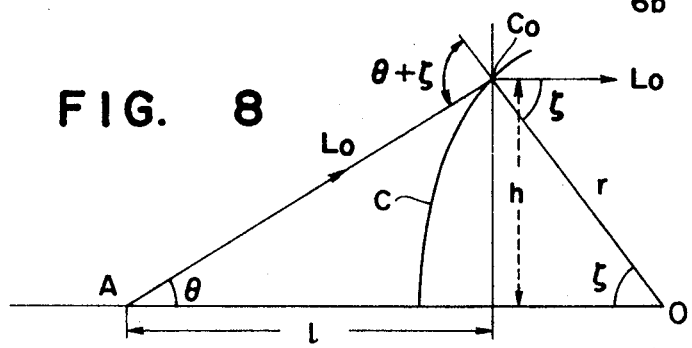
FIG. 8 is a diagram for looking for the curvature of the back side of the transparent base body in said embodiment.

Referring to FIG. 8 the method for finding the optimum configuration of convex surface 6a is as follows. First of all, in order that incident light ray Lo is refracted in parallel with the optical axis the following formulas are must to be satisfied:

$$\sin(\theta + \phi) = n \sin \phi$$
$$\phi = \tan^{-1} \sin \theta/n - \cos \theta \quad (1)$$

and $$r = h/\sin \phi \quad (2)$$

$$\tan \theta = h/l \quad (3)$$

Wherein, A — pupil corresponding to the rear side principal point of the objective lens component 1.

C — said incident plane 6a

O — center of curvature of said incident plane 6a

Q — angle embraced by light ray $L_o$ emitted from exit pupil A and coming into point $C_o$ on convex surface C and the optical axis.

$\phi$ — angle embraced by straight line connecting said curvature center with said point $C_o$ and the optical axis.

n — refractive index of transparent base body 6.

h — distance between point $C_o$ and the optical axis.

l — length on the optical axis between exit pupil A and incident point $C_o$.

r — radius of curvature.

From said formulas, both of the numerator and the denominator of the right side of formula (2) are a function of h, so that radius of curvature r becomes a function of h.

For example, in the case of $l = 60$ (mm), $n = 1.51$

When $h = 20$ mm, $r \approx 40$ mm

When $h = 10$ mm, $r \approx 36.8$ mm

Therefore, curvature surface 6a is required to be a non-spherical surface.

For practical use, however, if a spherical surface upon which the perimeter portion is perpendicularly incident is selected, deviation in the middle portion is small, so that the incident angle to the filter piece can be made nearly equal covering the whole range.

The above description has been explained on the transparent base bode of the plano-convex lens. However, also in the case of that filter disposition surface 6b is spherical the carvature of incident surface 6a can be found in the same manner.

Figure 9B:
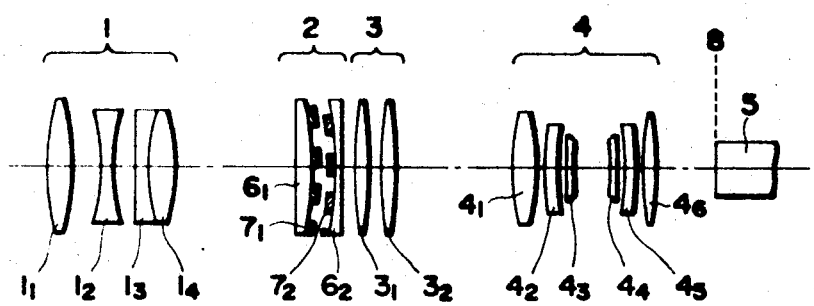
Figure 9C:
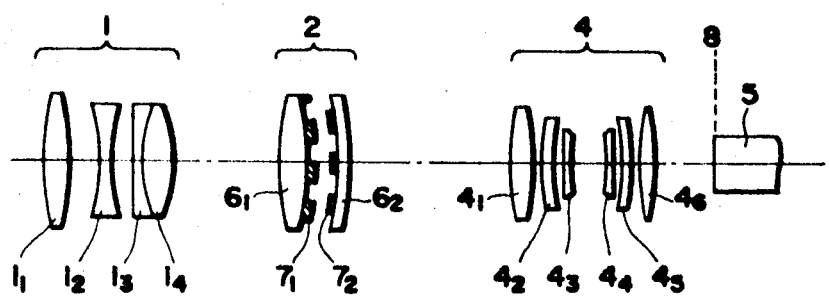

In FIG. 9(a), the color separation optical system incorporating the mosaic shaped color filter shown in FIG. 5(a) is shown, in FIG. 9(b) the color separation optical system incorporating the mosaic shaped color filter shown in FIG. 5(h) is shown, and in FIG. 9(c) the color separation optical system incorporating the mosaic shaped color filter shown in FIG. 5(j) is shown. In the case of FIG. 9(c) no field lens is required as previously described.

What is claimed is:

1. A color separation optical system having an objective lens component, a mosaic shaped color filter, and a relay lens component, which is so constructed that said mosaic shaped color filter is provided with a transparent base body having the incident surface facing said objective lens component, and the exit surface facing said relay lens component, and a dichroic filter in a striped pattern shape disposed on said exit surface of the transparent base body, and said incident surface is oblique to said exit surface, and thereby the light ray of the image forming light rays from said objective lens, which is reflected by said dichroic filter piece and reflected again on the surface on the incident side of said transparent base body is oblique to the light ray of the image forming light rays from said objective lens, which has passed directly through said dichroic filter piece.

2. A color separation optical system as claimed in claim 1, wherein proximate said mosaic shaped color filter a field lens component is disposed, and said field lens component directs the light ray of the image forming light rays from the objective lens, which passes directly through the dichroic filter of said mosaic shaped color filter into the incident picture angle of said relay lens, and directs the light ray of the image forming light rays from the objective lens component obliquely to said passing light ray, which is reflected by the dichroic filter and reflected on the incident surface of the transparent base body of said mosaic shaped color filter to the outside of the incident picture angle of said relay lens component.

3. A color separation optical system as claimed in claim 1, wherein said transparent base body is provided on its planar exit surface with said striped pattern shaped dichroic filter, and the planar incident surface thereof is oblique to said exit surface to form a prism therewith.

4. A color separation optical system as claimed in claim 3, including a prism which is of the same shape as said transparent base body and oppositely oriented relative to the optical axis, and said prism cancels the prism action to the incident light ray into the prism shaped transparent base body.

5. A color separation optical system as claimed in claim 13, wherein said mosaic shaped color filter is provided proximate its optical axis with a positive plano-convex lens, and said plano-convex lens has a power opposite and nearly equal in strength to that of said negative plano-concave lens shaped transparent base body.

6. A color separation optical system as claimed in claim 1, wherein said transparent base body comprises a plano-convex lens and is provided on its exit surface with said dichroic filter piece.

7. A color separation optical system as claimed in claim 6, wherein said mosaic shaped color filter is provided proximate its optical axis with a negative plano-concave lens, and said plano-concave lens has a power opposite and nearly equal in strength to that of said positive plano-convex lens shaped transparent base body.

8. A color separation optical system having an objective lens component, a mosaic shaped color filter, and a relay lens component, which is so constructed that said mosaic shaped color filter is provided with two transparent base bodies, and said transparent base bodies have respectively confronting convex and concave curved surfaces, and the back sides thereof are respectively formed into a lens shape of a curvature different from said surfaces respectively, and disposed on one curved surface in a striped pattern is a dichroic filter piece having a spectral permeable characteristic identical with each other, and disposed on the other curved surface in a striped pattern is a dichroic filter piece having a spectral permeable characteristic identical with each other in another spectral permeable characteristic different from said dichroic filter piece in the spectral permeable characteristic.

9. A color separation optical system as claimed in claim 8, wherein the transparent base body on the incident side on the objective lens component side is a negative power plano-concave lens component having a concave exit surface on which is disposed in the striped pattern said dichroic filter piece having the spectral permeable characteristic identical with each other, and the other transparent base body on the exit side of said relay lens side is a positive power plano-convex lens component having a convex incident surface corresponding to said concave surface of the former transparent base body, and on said convex surface is disposed in striped pattern said dichroic filter piece having another spectral permeable characteristic and in said both transparent base bodies said negative power and said positive power are nearly the same.

10. A color separation optical system as claimed in claim 8, wherein the transparent base body on the incident side on the objective lens component side is a positive power plano-convex lens component having a convex exit surface on which said dichroic filter pieces having the spectral permeable characteristic identical with each other are disposed in the striped pattern, and the other transparent base body is a negative power plano-concave lens component having on the exit side on the relay lens side a concave incident surface corresponding to said convex surface, and on said concave surface said dichroic filter piece having another spectral permeable characteristic is disposed in the striped pattern shape, and in said transparent base body said positive power and said negative power are nearly the same.

11. A color separation optical system as claimed in claim 8, wherein the transparent base body on the incident side on the objective lens component side comprises a biconvex lens with an exit surface on which are disposed the dichroic filter pieces having the spectral permeable characteristic identical with each other, and the other transparent base body on the exit side comprises a concave-convex lens, the exit surface of which is a convex surface and on the concave incident surface corresponding to said exit surface a dichroic filter piece having another spectral permeable characteristic is disposed, the resultant power of said both transparent base bodies being positive and and said transparent base bodies refracting the image forming light ray coming from the objective lens component to direct it into the incident picture angle of the relay lens.

12. A color separation optical lens having an objective lens component, a mosaic shaped color filter, and a relay lens, component which is so constructed that said mosaic shaped color filter is provided with a convex incident surface facing said objective lens component and an exit surface and dichroic filter pieces, disposed on said exit surface and said incident surface refracts the image forming light ray coming from the objective lens component to direct it nearly in the same incident angle to said dichroic filter pieces, and a portion of said incident light ray passes through said dichroic filter pieces and at the same time the reflected light ray of the light rays reflected by said dichroic filter pieces, which is reflected again by said incident surface is directed at an incident angle different from said incident light ray onto said dichroic filter pieces.

13. A color separation optical system as claimed in claim 1 wherein said transparent base body comprises a plano-concave lens component and is provided on its exit surface with said dichroic filter piece.

* * * * *